United States Patent
Stallings et al.

(10) Patent No.: US 9,106,967 B2
(45) Date of Patent: Aug. 11, 2015

(54) INTERACTIVE MEDIA PROGRAM GUIDE USER INTERFACE SYSTEMS AND METHODS

(71) Applicant: Verizon Patent and Licensing Inc., Arlington, VA (US)

(72) Inventors: Heath Stallings, Colleyville, TX (US); Omar A. Abou-Khamis, Irving, TX (US); Andrien J. Wang, Keller, TX (US); Jonathan Lott, Wylie, TX (US); Don G. Archer, Euless, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 13/939,910

(22) Filed: Jul. 11, 2013

(65) Prior Publication Data

US 2015/0020111 A1 Jan. 15, 2015

(51) Int. Cl.
*H04N 21/47* (2011.01)
*H04N 21/482* (2011.01)

(52) U.S. Cl.
CPC ................ *H04N 21/4821* (2013.01)

(58) Field of Classification Search
USPC ................................ 725/39, 40, 52
See application file for complete search history.

(56) References Cited

U.S. PATENT DOCUMENTS

| 6,445,398 | B1 * | 9/2002 | Gerba et al. | 715/721 |
| 2010/0333139 | A1 * | 12/2010 | Busse et al. | 725/44 |
| 2014/0007163 | A1 * | 1/2014 | Johnson et al. | 725/43 |

* cited by examiner

*Primary Examiner* — Kieu Oanh T Bui

(57) ABSTRACT

An exemplary method includes an interactive media program guide system 1) displaying a user-scrollable view of a section of a paginated column of an interactive media program guide that includes a two-dimensional matrix grid of cells representing a plurality of media program listings, 2) detecting a user selection of a cell included in the matrix grid of cells and the user-scrollable view, the cell representing a media program listing included in the plurality of media program listings, and, 3) in response to the user selection of the cell, expanding the cell in-place within the paginated column of the interactive media program guide and populating the expanded cell with display content associated with a media program represented by the media program listing. Corresponding systems and methods are also described.

26 Claims, 16 Drawing Sheets ically with the paginated column) that is distinct from data structures associated with other paginated columns.

INTERACTIVE MEDIA PROGRAM GUIDE USER INTERFACE SYSTEMS AND METHODS

BACKGROUND INFORMATION

Advances in computing technologies have provided users of computing devices with access to a variety of computing tools. To illustrate, increased capabilities of computing devices such as mobile smart phones and tablet computers have allowed users of the devices to access and use a variety of software applications that have been developed for the computing devices.

Such advances have challenged designers of user interfaces for devices such as mobile smart phones and tablet computers. A common challenge has been to design and implement user interfaces that provide an appropriate balance of information, usability, intuitiveness, control, efficiency, and functionality that promotes a quality user experience. While user interface technologies have made significant advances in this regard, there remains room for improvement. For instance, there remains room to improve the intuitiveness, convenience, efficiency, and/or usability of user interfaces that are designed to be used by a user of a mobile device to navigate media program listings to locate and access media content that is of interest to the user.

For example, an interactive media program guide application running on a mobile device having a touch screen display may provide a user interface that allows a user of the mobile computing device to scroll across an interactive media program guide to view media program listings (e.g., television program listings) included in the guide. Such an application typically utilizes scrolling capabilities that are native to the mobile device (e.g., scrolling capabilities provided by an operating system of the mobile device) to continuously move (e.g., pan and/or tilt) the user's view across a larger overall image of the interactive media program guide that is not wholly displayed on the touch screen display. Such scrolling is known as "smooth scrolling."

To support smooth scrolling, the mobile device typically renders and caches an overall image of the entire interactive media program guide such that the cached image is available for local access and use by the device to display different views of the image of the guide as the user scrolls across the image, without the device having to perform computations involved in rendering the overall image each time the user scrolls. This provides a smooth scrolling experience to the user.

However, the caching and using of the cached overall image by the device as described above places limitations on a user interface. For example, because the entire overall image of the interactive media program guide is rendered and cached in order to support smooth scrolling, each rendering and caching of the overall image may be resource intensive. Accordingly, certain user interface features that may require re-rendering and re-caching of the overall image may be impractical to include in the user interface, especially when the amount of data included in the overall image being rendered and cached is large. For example, a feature that resizes a graphic included in the overall image of the interactive media program guide may be impractical to include in a user interface that allows a user to continuously scroll across an overall image of the entire interactive media program guide, especially when the interactive media program guide is large and includes many media program listings (e.g., listings for several days or weeks of television programming on hundreds of television channels).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
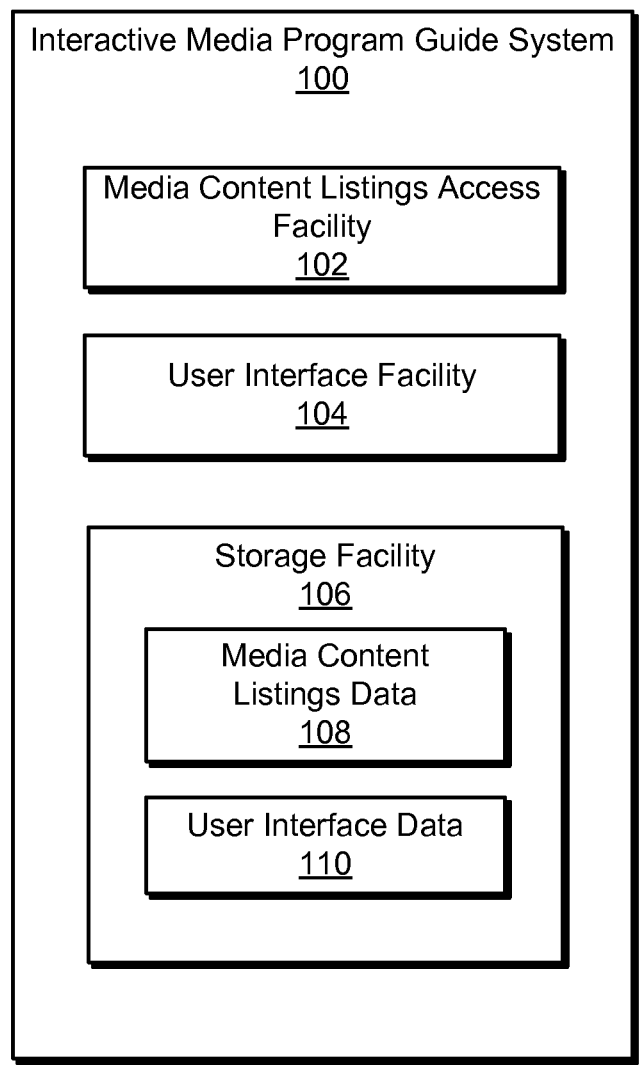
FIG. 1 illustrates an exemplary interactive media program guide system according to principles described herein.

Exemplary interactive media program guide user interface systems and methods are described herein. The exemplary systems and methods may represent an interactive media program guide that includes a two-dimensional matrix grid of cells as a series of discrete paginated columns (e.g., paginated columns that represent a series of segments of time along a time dimension of the matrix grid of cells) and use one or more of the paginated columns included in the series to provide an interactive media program guide user interface. For example, the exemplary systems and methods may display a user-scrollable view of a section of a paginated column of the interactive program guide, detect a user selection of a cell included in the user-scrollable view, and, in response to the user selection, expand the cell in-place within the paginated column and populate the expanded cell with display content associated with a media program represented by the cell (e.g., a media program represented by a media program listing associated with the cell).

As used herein, a "paginated column" of an interactive media program guide refers to a column of the interactive media program guide that is divided and separate from the remainder of the interactive media program guide (e.g., it is divided and separated from the other discrete paginated columns of the interactive media program guide). For example, the paginated column may be defined and represented as an independent and discrete data structure (e.g., a table associated with a table control view used for user interface operations). Accordingly, user interface operations may be applied to the paginated column independently of the other paginated columns of the interactive media program guide. Each paginated column may be configured to be treated as a separate and independent page to be displayed one at a time on a display screen.

By representing the interactive media program guide as a series of paginated columns and using one or more of the paginated columns to provide an interactive media program guide user interface, the systems and methods described herein may provide an interactive media program guide user interface that offers one or more features that are unavailable, impractical, and/or inefficient in conventional interactive media program guide user interfaces. The use of paginated columns may provide feature efficiencies (e.g., efficiencies in processing performed and/or resources used to provide the features) that may increase the practicality and/or availability of one or more user interface features. For example, the use of paginated columns to represent the interactive media program guide may facilitate an efficient in-place cell expansion, which may allow the user interface to efficiently provide, in-place within a matrix grid of cells, display content (e.g., additional media program listing information, user selectable options, and/or live video playback) associated with a media program represented by a media program listing associated with a cell in the interactive media program guide, such as described herein.

These and/or other benefits or advantages of the exemplary systems and methods will be made apparent herein. Exemplary interactive media program guide user interface systems, methods, and devices will now be described in reference to the drawings.

FIG. 1 illustrates an exemplary interactive media program guide system 100 ("system 100"). As shown, system 100 may include, without limitation, a media program listings access facility 102 ("access facility 102"), a user interface facility 104, and a storage facility 106 selectively and communicatively coupled to one another. Any suitable communication technologies, including any of the communication technologies mentioned herein, may be employed to facilitate communications between facilities 102-106. It will be recognized that although facilities 102-106 are shown to be separate facilities in FIG. 1, any of facilities 102-106 may be combined into fewer facilities, such as into a single facility, or divided into more facilities as may serve a particular implementation.

Access facility 102 may be configured to access data representative of information about or otherwise related to media content, such as data representative of one or more media program listings representing one or more media content programs. Access facility 102 may be configured to access media program listings from any suitable source or combination of sources configured to provide media program listings, including one or more local data stores, remote data stores, server devices, media content processing devices, information feeds, media content information services (e.g., electronic program guide data services), and/or any other sources of media program listings. In certain examples, access facility 102 may be configured to fetch media program listings data from any of these sources as directed by user interface facility 104 (e.g., as needed by user interface facility 104), such as described herein.

The term "media program listing" may refer to any representation of a media content program. The representation may include one or more graphics and/or information descriptive of or otherwise associated with the media content program. For example, a media program listing may indicate a name of the program, a source of the program (e.g., a content provider), a genre of the program, a description of the program, a channel by which the program is transmitted and/or accessed, a popularity of the program, a time associated with the program (e.g., a time the program was transmitted, a scheduled future transmission time of the program, and/or a time of recording of the program), an image associated with the program (e.g., a thumbnail image associated with the media content program and/or a source of the media content program), and/or any other information associated with the media content program. In certain embodiments, media program listings may include listings for scheduled transmissions of media programs (e.g., a television programming schedule), listings for on-demand media programs, listings of recorded media programs (e.g., recorded transmissions of television programs), listings for most popular media programs (e.g., most-watched television programs at a given time), and any other listings representative of any other media content programs. Examples of GUI views displaying media program listings are described herein.

The term "media content program" (or simply "media program" or "program") may refer to any television program (e.g., a television program transmitted, being transmitted, or scheduled for future transmission by a content provider and/or a recording (e.g., a DVR recording) of a transmitted television program), on-demand media program, pay-per-view media program, broadcast media program (e.g., broadcast television program), multicast media program, narrowcast media program, IPTV program, video program, audio program, streamed media program, movie, podcast (e.g., audio and/or video podcast), media feed, (e.g., audio and/or video feed), music files, images (e.g., photographs, or any other discrete instance of media content that may be accessed and/or presented by one or more media content processing devices for experiencing by a user.

User interface facility 104 may be configured to perform one or more of the user interface operations described herein, including providing output to and/or receiving input from a user. For example, user interface facility 104 may be configured to provide output by generating and providing one or more graphical user interfaces ("GUIs") for display, such as any of the exemplary GUIs and/or GUI views described herein. For instance, user interface facility 104 may provide an interactive media program guide user interface (e.g., an interactive media program guide GUI), which may include a user-scrollable view of a section of the interactive media program guide. Examples of an interactive media program guide user interface are described herein.

User interface facility 104 may be further configured to receive user input by way of a touch screen display. For example, predefined touch input provided by a user on a touch screen display may be detected by user interface facility 104. Predefined touch input may include any touch screen input that may be provided by the user and detected by way of a touch screen display. In certain examples, touch input may include one or more predefined touch gestures that may be provided by the user and detected by way of a touch screen display. Touch input, such as one or more touch gestures, may be provided by the user in relation to one or more elements included in a displayed view of a section of an interactive media program guide. Examples of predefined touch input used to interact with a displayed view of an interactive media program guide are described herein.

Storage facility 106 may be configured to store media program listings data 108 representative of one or more media program listings. Media program listings data 108 may include any media program listings data accessed by and/or accessible to access facility 102. Storage facility 106 may be further configured to store user interface data 110, which may include any data used and/or generated by user interface facility 104 to provide an interactive media program guide user interface. Storage facility 106 may maintain additional or alternative data as may serve a particular implementation.

Figure 2:
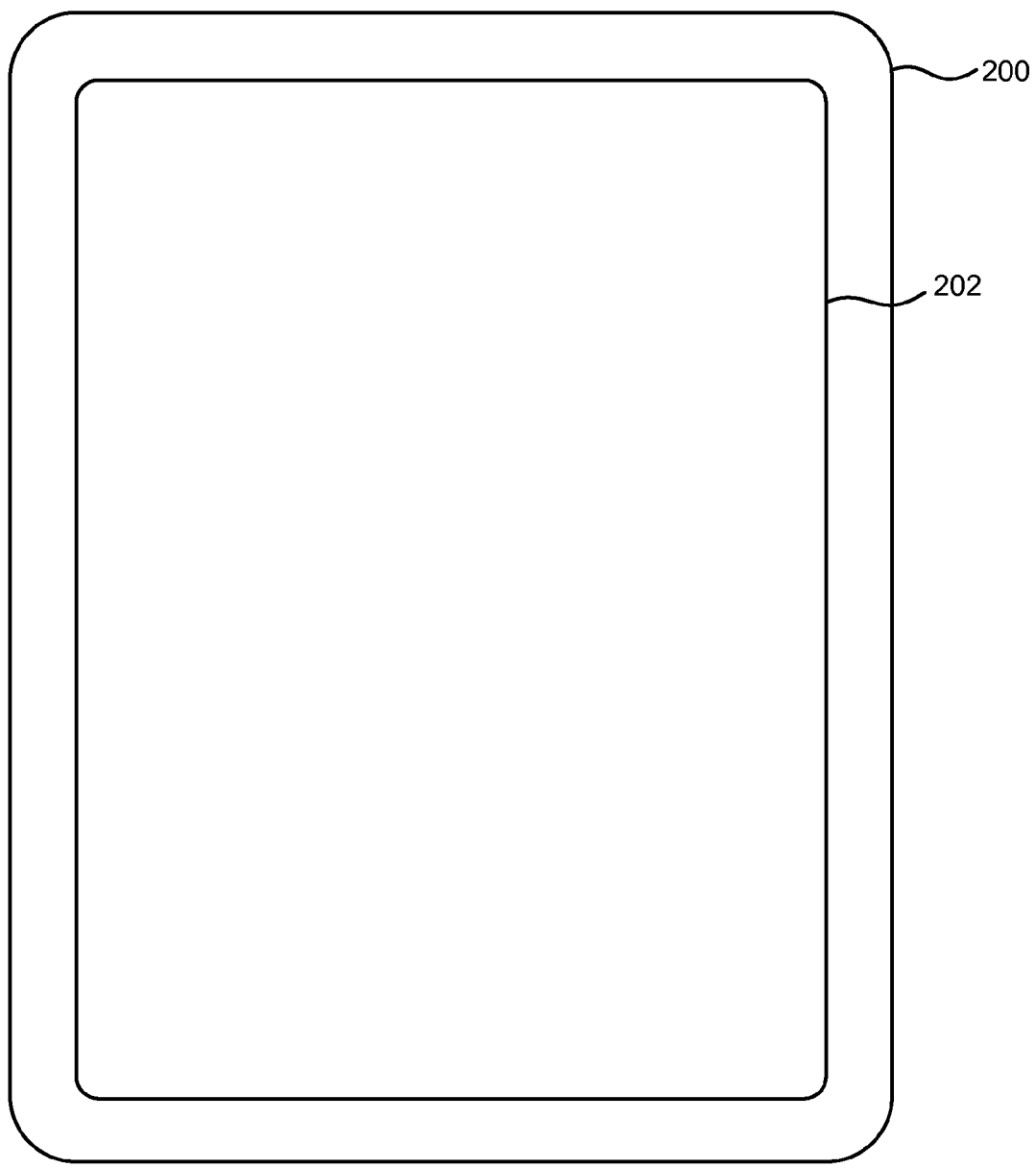
FIG. 2 illustrates an exemplary user device implementing the system of FIG. 1 according to principles described herein.

System 100 may be implemented by one or more devices capable of accessing media program listings and providing an interactive media program guide user interface. For example, FIG. 2 illustrates an exemplary user device 200 ("device 200") having system 100 implemented thereon. Device 200 may include one or more of the facilities 102-106 shown in FIG. 1 and may be configured to perform one or more of the processes and/or operations described herein. Device 200 may include, but is not limited to, a mobile device (e.g., a mobile phone device, smart phone device, tablet computer, laptop computer, netbook device, etc.), media processing device, computer, gaming device, and/or any other device capable of accessing media program listings and providing an interactive media program guide user interface as described herein.

As shown in FIG. 2, device 200 may include a touch screen display 202 configured to display one or more GUIs for viewing by a user of device 200 and to detect user input provided by a user by way of the touch screen display. Touch screen display 202 may be included in or otherwise interfaced with user interface facility 104 and may include single-touch and/or multi-touch touch screen technologies. Examples of GUIs that may be displayed on touch screen display 202 are described herein.

Figure 3:
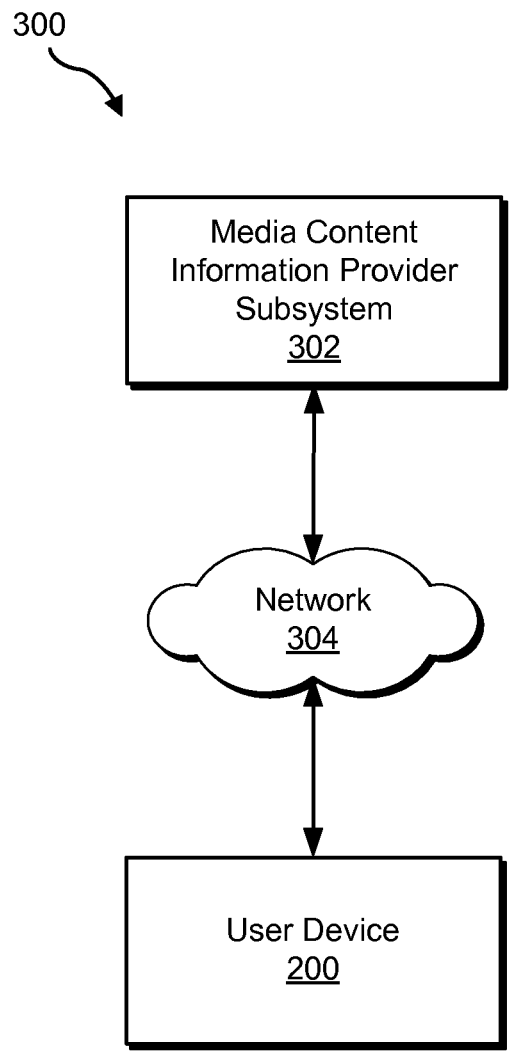
FIGS. 3-5 illustrate exemplary implementations of the system of FIG. 1 according to principles described herein.

While FIG. 2 illustrates an exemplary implementation of system 100, system 100 may be implemented in other ways. For example, FIG. 3 illustrates an exemplary implementation 300 of system 100. As shown in FIG. 3, implementation 300 may include device 200 configured to communicate with a media content information provider subsystem 302 ("provider subsystem 302") by way of a network 304. In implementation 300, any of facilities 102-106 of system 100 may be implemented by access device 200, provider subsystem 302, or distributed across access device 200 and provider subsystem 302.

Provider subsystem 302 and device 200 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Global System for Mobile Communications ("GSM") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), Code Division Multiple Access ("CDMA") technologies, in-band and out-of-band signaling technologies, and other suitable communications technologies.

Network 304 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between device 200 and provider subsystem 302. Communications between device 200 and provider subsystem 302 may be transported using any one of the above-listed networks, or any combination or sub-combination of the above-listed networks. Alternatively, device 200 and provider subsystem 302 may communicate in another way such as by one or more direct connections between device 200 and provider subsystem 302.

Device 200 may be configured to access media program listings data from provider subsystem 302 by way of network 304 in any suitable way. In some examples, device 200 may be configured to access media program listings data from provider subsystem 302 in an ad hoc manner as needed by one or more applications running on device 200. Additionally or alternatively, device 200 may be configured to periodically access media program listings data from provider subsystem 302 (e.g., as part of a nightly background process) for local storage and use by device 200.

In certain examples, device 200 may be configured to access media program listings data from provider subsystem 302 in blocks as needed by one or more applications running on device 200. For example, device 200 may fetch media program listings data for a block of media program listings represented by a block of cells included in an interactive media program guide. Examples of this are described herein.

Provider subsystem 302 may include one or more computing devices configured to access, maintain, and/or provide media program listings data. In certain examples, provider subsystem 302 may include one or more server devices configured to provide media program listings data as part of a service. In other examples, provider subsystem 302 may include one or more media content processing devices (e.g., a set-top-box device, DVR device, television, gaming console, personal media player, media server, etc.) capable of accessing and presenting media content for experiencing by an end user of a media service. In other examples, provider subsystem 302 may include a combination of one or more server devices configured to provide media program listings data as part of a service and one or more media content processing devices capable of accessing and presenting media content for experiencing by an end user of a media service. In such examples, access device 200 may be configured to access media program listings data from one or more server devices and/or from one or more media content processing devices.

Figure 4:
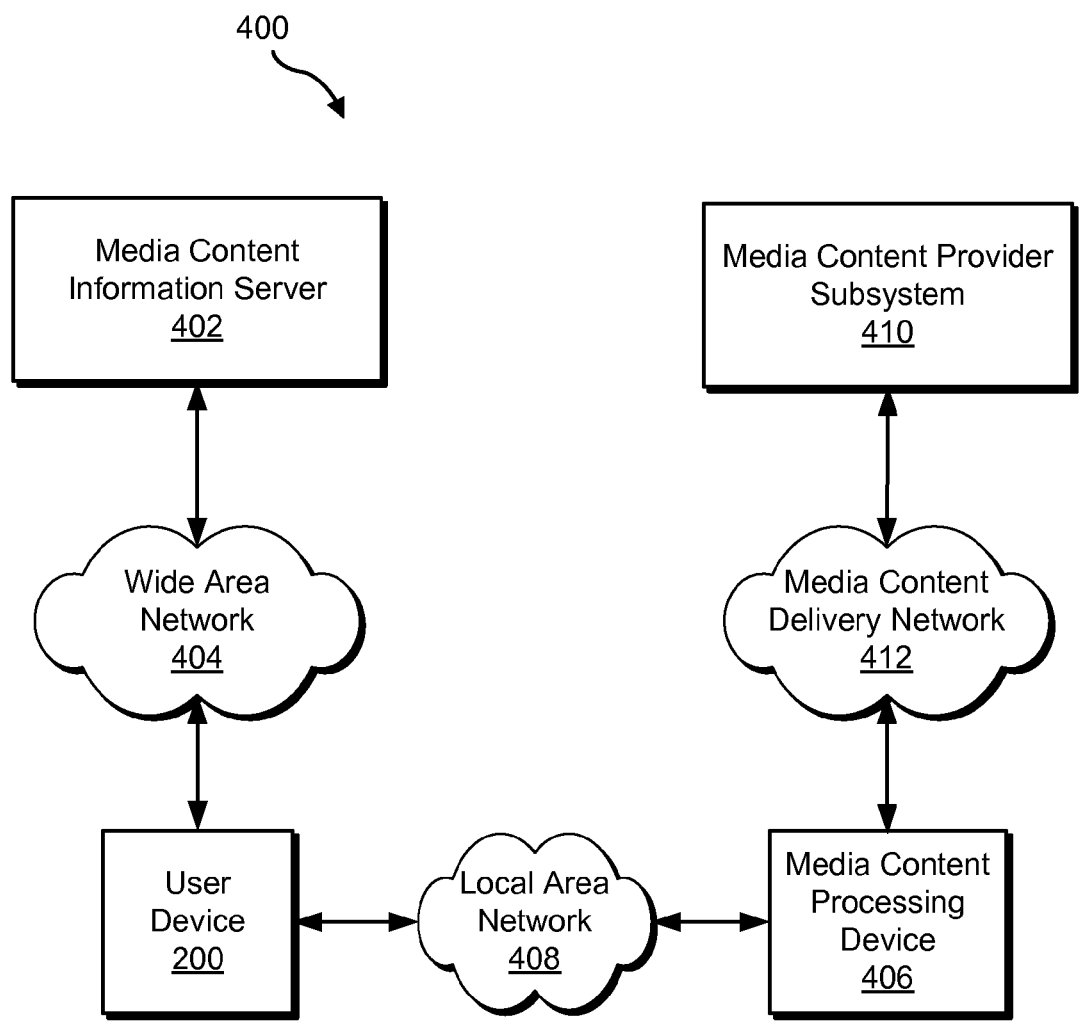

To illustrate, FIG. 4 shows another exemplary implementation 400 in which access device 200 may be communicatively coupled to a media content information server 402 by way of a wide area network 404 (e.g., the Internet, a subscriber television network, a wireless mobile phone data network, etc.) and to a media content processing device 406 by way of a local area network 408 (e.g., a home LAN, a Wi-Fi network, a Bluetooth network connection, etc.). Accordingly, device 200 may be configured to access media program listings data from media content information server 402 and/or from media content processing device 406.

Media content processing device 406 may include any device configured to access media content from a media content provider subsystem 410 by way of a media content delivery network 412 for processing and presentation to a user. Media content processing device 406 may include, but is not limited to, a set-top-box device, a DVR device, a computer, a television, a personal media player device, and/or any other device capable of accessing, processing, and presenting media content for presentation to a user.

In certain examples, media content processing device 406 may be further configured to access and store media program listings data. For example, media content processing device 406 may access media program listings data associated with a finite time period from one or more sources and store the data for local use by media content processing device 406. Media content processing device 406 may also be configured to generate media program listings data and/or information to be associated with media program listings data (e.g., information indicating when media content processing device 406 recorded a television program).

Media content processing device 406 and media content provider subsystem 410 may communicate by way of media content delivery network 412 using any suitable communication technologies, devices, networks, media, and protocols supportive of remote data communications, including any of those mentioned herein. Media content delivery network 412 may include one or more networks or types of networks (and communication links thereto) capable of carrying communications, media content, and/or data signals between media content provider subsystem 410 and media content processing device 406. For example, network 412 may include, but is not limited to, one or more wireless networks (e.g., satellite media broadcasting networks or terrestrial broadcasting networks), mobile phone data networks, subscriber television networks (e.g., broadcast, multicast, and/or narrowcast television networks), video delivery networks, satellite networks, cable networks, hybrid fiber coax networks, optical fiber networks, broadband networks, narrowband networks, the Internet, wide area networks, and any other networks capable of carrying data and/or communications signals between media content provider subsystem 410 and media content processing device 406. Communications between media content provider subsystem 410 and media content processing device 406 may be transported using any one of above-listed networks, or any combination or sub-combination of the above-listed networks.

Media content provider subsystem 410 may include one or more devices configured to provide one or more media services to media content processing device 406, including transmitting data representative of media content over network 412. In certain embodiments, media content provider subsystem 410 may be configured to transmit television programming content over network 412 in accordance with a transmission schedule. Additionally or alternatively, media content provider subsystem may be configured to transmit media content on-demand. In certain implementations, media content provider subsystem 410 may include one or more video head-end and/or video hub office ("VHO") devices, and network 412 may include a subscriber television network.

Figure 5:
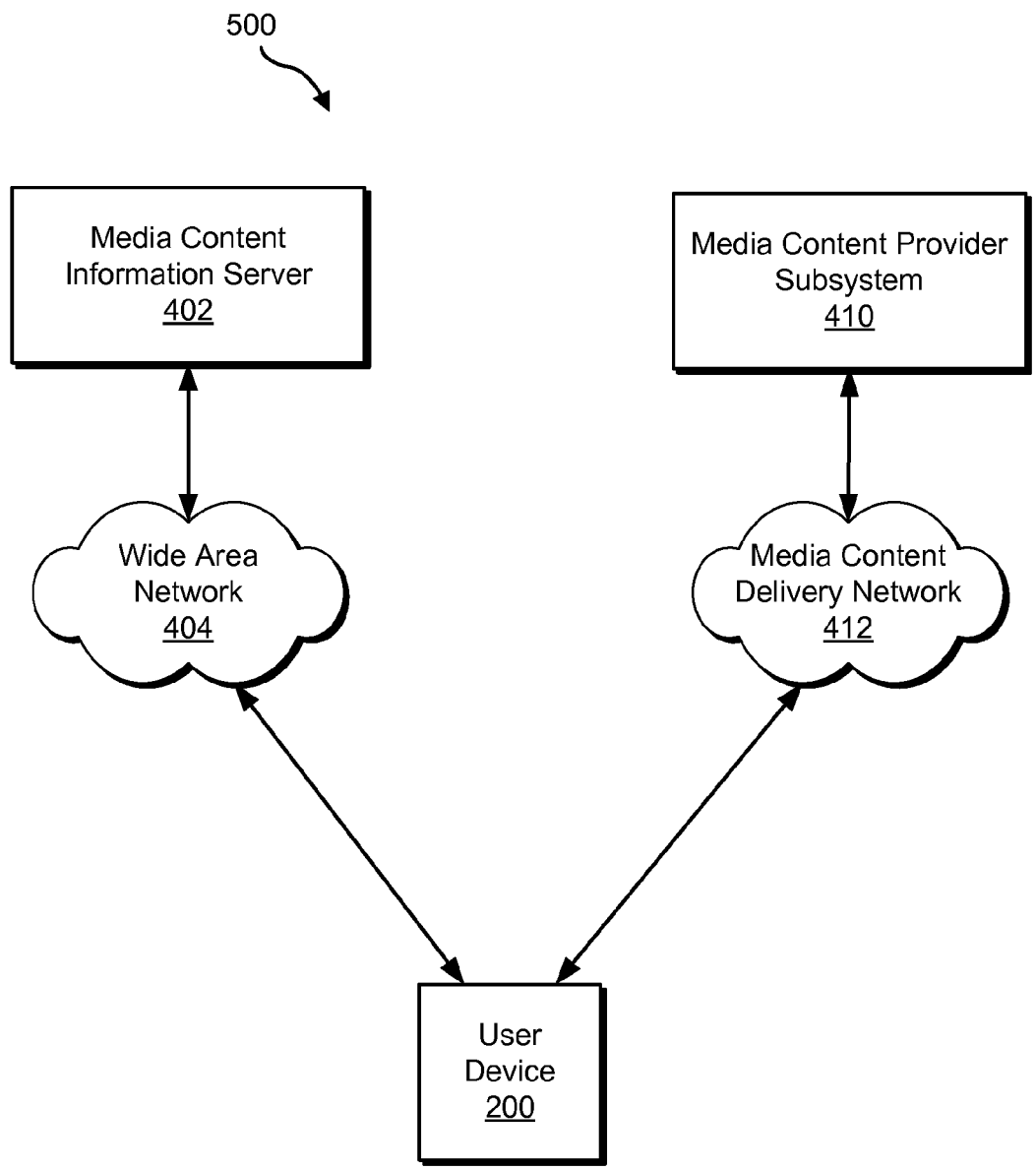

In certain implementations, device 200 may be further configured to access, process, and present media content for experiencing by a user. FIG. 5 illustrates another exemplary implementation 500 in which device 200 is configured to access media program listings data from media content information server 402 by way of wide area network 404 and media content from media content provider subsystem 410 by way of media content delivery network 412.

Figure 6:
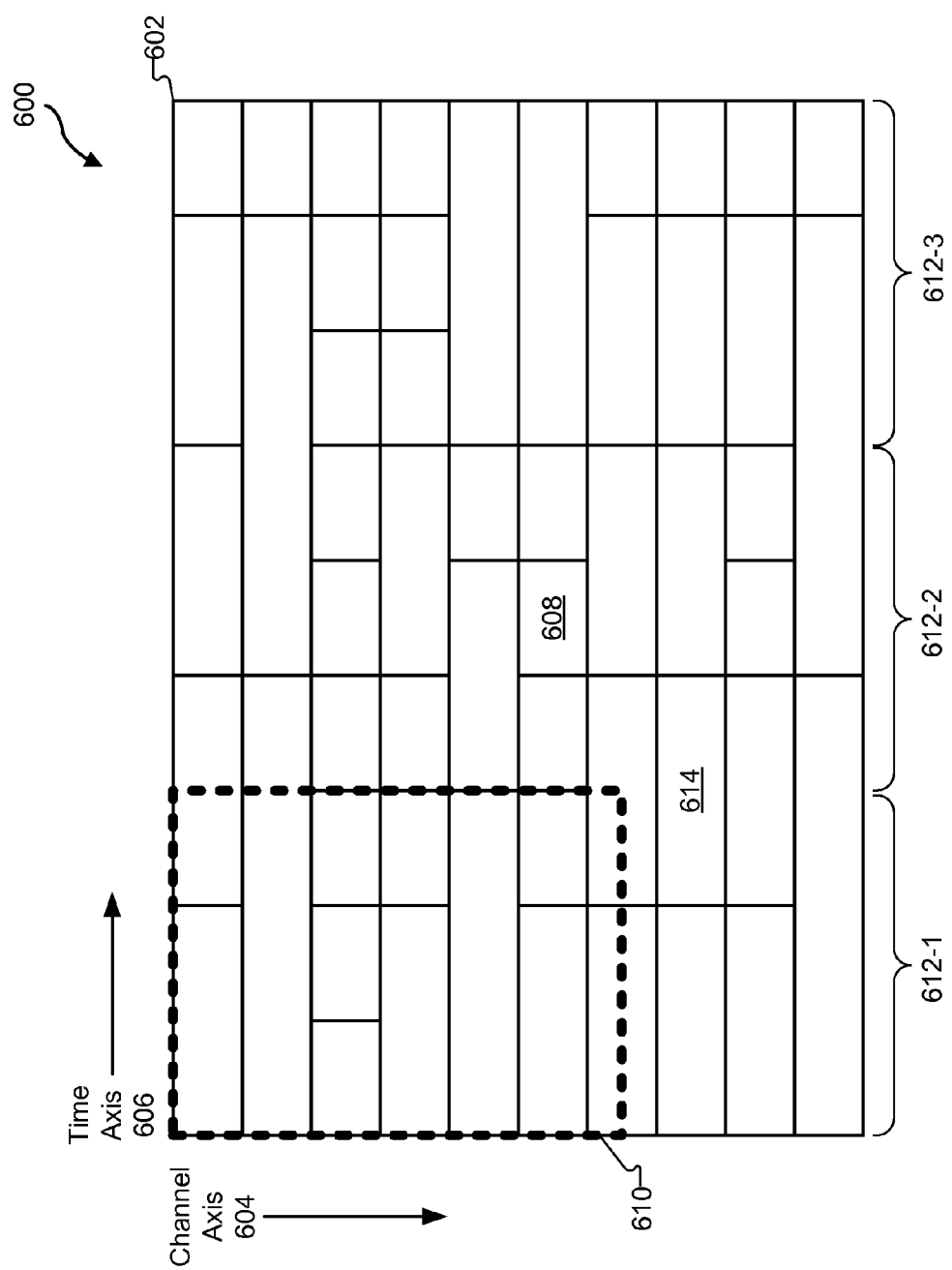
FIG. 6 illustrates a representation of an exemplary interactive media program guide according to principles described herein.

System 100 and/or device 200 may be configured to provide an interactive media program guide user interface for use by a user of device 200 to access an interactive media program guide, media program listings represented in the guide, and/or media programs represented by the media program listings. FIG. 6 illustrates an exemplary interactive media program guide 600 that includes a two-dimensional matrix grid 602 of cells arranged along two orthogonal dimensions, namely a channel dimension represented by a channel axis 604 and a time dimension represented by a time axis 606. Each cell in the grid 602 may be associated with a media program listing for a media program, such as a media program listing for a media program that is scheduled to be transmitted on a particular media channel (e.g., a television channel) represented by a channel row positioned along the channel axis 604 and at a particular time slot (e.g., a television programming time slot) positioned along the time axis 606.

For example, the matrix grid 602 of cells may include a cell 608 associated with a media program listing for a media program. The position of cell 608 within the matrix grid 602 of cells indicates the particular media channel and time slot for the scheduled transmission of the media program represented by the media program listing associated with the cell 608. For example, cell 608 may be positioned in a channel row corresponding to the particular channel and in a time slot column corresponding to the particular time slot. The width of cell 608 may indicate the duration of the time slot (e.g., the width of cell 608 may indicate a thirty-minute time slot).

Although not shown in FIG. 6, the cells in matrix grid 602 may be populated to include media program listing information when displayed in a GUI view. For example, each displayed cell may include information indicating a title of a media program represented by the cell.

User interface facility 104 may be configured to display a user-scrollable view of a section of the interactive media program guide 600 in an interactive media program guide user interface. FIG. 6 illustrates an exemplary user-scrollable view of a particular section of the interactive media program guide 600 as defined by dashed-line box 610. The user-scrollable view is of the section of the interactive media program guide 600 within the dashed-line box 610. The remainder of the interactive media program guide 600 outside of dashed-line box 610 is outside of the particular section and thus not displayed within the user-scrollable view. The section of the interactive media program guide 600 to be displayed in the user-scrollable view may be determined in any suitable way by user interface facility 104.

User interface facility 104 may be configured to scroll the user-scrollable view across the interactive media program guide 600 based on user input. For example, user interface facility 104 may scroll the user-scrollable view horizontally and/or vertically in response to user input such as generally horizontal and/or vertical touch gestures (e.g., swipes) provided by a user on touch screen display 202. Examples of user interface facility 104 scrolling the user-scrollable view across the interactive media program guide 600 are described herein.

Instead of treating the interactive media program guide 600 as a whole (as an overall image of the entire interactive media program guide 600) for user interface operations as has been done conventionally, user interface facility 104 may be configured to represent the interactive media program guide 600 as a series of paginated columns that represent segments of time along the time axis 606. For example, user interface facility 104 may divide the interactive media program guide 600 into a series of paginated columns 612 (e.g., page columns 612-1, 612-2, and 612-3). As shown in FIG. 6, each paginated column 612 in the series may represent a different, non-overlapping segment of time along the time axis 606.

In certain examples, the lengths of the time segments represented by the paginated columns 612 may be uniform. For example, each of the paginated columns 612 may represent the same length of time. This length of time may be represented by the width of each of the paginated columns 612 (i.e., "pagination column width"), which may span a certain length of time along the time axis 606. Accordingly, the pagination column width of a pagination column 612 may define a length of time of a time segment spanned by the paginated column 612 along the time axis 606. As shown in FIG. 6, the paginated columns 612 may be uniform in width.

In certain examples, user interface facility 104 may be configured to paginate the interactive media program guide 600 into a series of paginated columns, such as paginated columns 612. This may be performed in accordance with a predefined pagination heuristic, which may specify one or more rules for identifying and defining paginated columns. To this end, user interface facility 104 may be configured to determine the time segment length and/or the paginated column width for the series of paginated columns 612 based at least in part on one or more attributes of a display screen associated with an interactive media program guide user interface (e.g., a display screen on which a section of the interactive media program guide 600 is to be displayed in the interactive media program guide user interface). For example, the width of each paginated column 612 may be set by user interface facility 104 based on a screen size (e.g., the width of the display screen such as the number of pixels across a row of pixels of the display screen) and/or a screen resolution of the display screen.

Based on one or more of such display screen attributes, user interface facility 104 may determine what graphical assets will fit within the width of the display screen. For example, each cell may be represented by one or more graphical assets in an interactive media program guide user interface view. The graphical assets may have predefined sizes, which may be specific to a device and/or to a display screen size of a device. User interface facility 104 may utilize the sizes of the graphical assets and the width of the display screen (e.g., pixel width) to determine what graphical assets will fit within the width of the display screen. This may include determining a length of time along the time axis 606 that can be displayed within the width of the display screen. User interface facility 104 may then set the paginated column width equal to the determined length of time and/or display screen width and divide the interactive media program guide 600 into a series paginated columns 612 each having the paginated column width. Accordingly, each paginated column may have a paginated column width that fits within and/or substantially fills the width of the display screen. Accordingly, the display screen may display a view of one paginated column at a time. In this respect, each paginated column is treated as a page for display one at a time on the display screen.

To illustrate, a tablet computer may have a display screen pixel width of 768 pixels when the tablet computer is held in a portrait view position. User interface facility 104 may determine that graphical assets (which may be specific to the mobile phone device) for a three-hour length of time will fit within and/or fill the pixel width of the display screen and define the paginated column width to coincide with the three-hour length of time. As another example, the tablet computer may be rotated into a landscape view position, in which case the display screen pixel width is 1,024 pixels. In this case, user interface facility 104 may determine that graphical assets for a four-hour length of time will fit within and/or fill the pixel width of the display screen and define the paginated column width to coincide with the four-hour length of time. As another example, a mobile phone may have a display screen pixel width of 640 pixels when the mobile phone is held in a portrait view position. User interface facility 104 may determine that graphical assets (which may be specific to the mobile phone device) for a one-and-a-half-hour length of time will fit within and/or fill the pixel width of the display screen and define the paginated column width to coincide with the one-and-a-half-hour length of time.

Certain cells included in the matrix grid 602 may be split by a division of matrix grid 602 into separate paginated columns 612. Such cells may be represented in multiple paginated columns 612. For example, cell 614 shown in FIG. 6 may be split into two pieces by a division of matrix grid 602 into paginated columns 612. One piece of cell 614 may be represented in paginated column 612-1, and another piece of cell 614 may be represented in paginated column 612-2.

Figure 7:
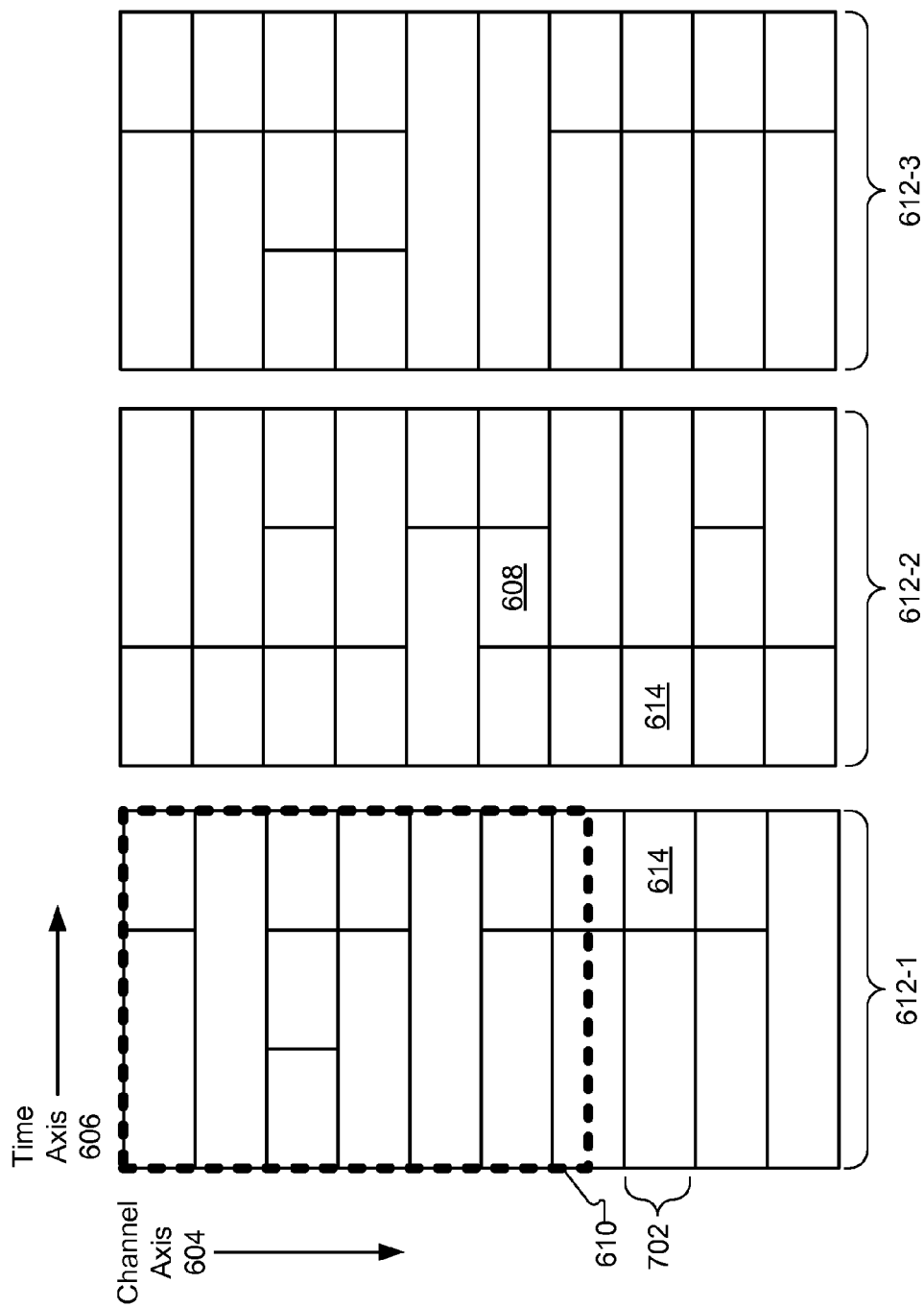
FIG. 7 illustrates the interactive media program guide of FIG. 6 represented as a series of separate and discrete paginated columns according to principles described herein.

To illustrate, FIG. 7 shows interactive media program guide 600 represented as a series of separate and discrete paginated columns 612. The series of paginated columns 612 may be consecutively ordered along the time axis 606. As shown, cell 614 may be represented in both paginated column 612-1 and paginated column 612-2, which are adjacently position in the series of paginated columns 612.

In certain implementations, user interface facility 104 may be configured to use a table view control, such as a table view control that is native to an operating system running on device 200 (e.g., a table view control in an operating system known as "iOS") to represent a paginated column 612. The table view may be customized such that each row in the table is a channel row that represents a media channel. Each channel row may be labeled with a channel identifier such as a channel number or name.

The table view may be further customized such that each row is able to include one or more cells representing one or more media program listings for one or more media programs, depending on how many media program listings are on a media channel within the segment of time represented by the paginated column 612. Accordingly, each row may be populated with graphical assets for one or more cells representing one or more media program listings when the table view is rendered and displayed.

As an example, user interface facility 104 may be configured to use a table view control to represent paginated column 612-1 as a table of channel rows. Each channel row may include one or more cells representing one or more media program listings. For example, a particular channel row 702 of paginated column 612-1 may include two cells representing media program listings for two media programs.

Each of the paginated columns 612 may be used independently of or together with one or more of the other paginated columns 612 in one or more user interface operations that may be performed by user interface facility 104. For example, a user interface operation may be applied to one paginated column 612 independently of the other paginated columns 612 (e.g., by applying the user interface operation to paginated column 612-1 without applying the user interface operation to paginated column 612-2 or 612-3). This may allow user interface facility 104 to provide user interface features efficiently at least because user interface operations associated with the features need not be applied across the entirety of interactive media program guide 600. In certain implementations, such efficiencies may make one or more user interface features possible, or at least more practical and/or desirable than they would have been in conventionally implemented media program guide user interfaces.

As an example of user interface operations, user interface facility 104 may use a paginated column to provide an interactive media program guide user interface such as by displaying, on a display screen, a user-scrollable view of a section of the paginated column. For instance, user interface facility 104 may use paginated column 612-1 to display a user-scrollable view of a section of the paginated column 612-1 that is located within dashed line box 610, as illustrated in FIG. 7. The displaying may include fetching media program listing data for cells included in the section (e.g., graphical assets for the cells included in the section and/or for the media program listings represented by the cells) from local memory of device 200 if cached therein and/or from provider subsystem 302 over network 340. User interface facility 104 may communicate with access facility 102 to initiate such fetching and/or to receive fetched graphical assets. User interface facility 104 may use the fetched media program listings data such as graphical assets for the cells to render the user-scrollable view of the section of the paginated column 612-1. Graphical assets for the section of the paginated column 612-1 may be fetched without fetching and/or independently of any fetching of graphical assets for other paginated columns 612-2 and 612-3.

In certain example, graphical assets may be fetched in blocks as needed by user interface facility 104. The size of a block may be defined as may suit a particular implementation.

In certain examples, the width of the block may be defined by user interface facility 104 to equal the paginated column width (i.e., the width of each paginated column 612). Accordingly, a block of fetched data may be specific to a paginated column 612.

In certain examples, the height of the block may be defined to include a certain number of channel rows (e.g., sixty channel rows). This may allow graphical assets to be fetched for only positionally relevant media program listings, such as graphical assets for media program listings represented by a block of cells that is within and/or proximate to a current position of the user-scrollable view relative to a paginated column. For example, for a paginated column that includes hundreds of channel rows, user interface facility 104 may selectively fetch graphical assets for only a block of sixty channel rows that are located within and/or proximate to the current position of the user-scrollable view on the paginated column.

When the position of the user-scrollable view changes (e.g., scrolls as described herein), user interface facility 104 may determine, based on a new position of the user-scrollable view, whether a new block of graphical assets is fetched. If the new position is within a block that has already been fetched, user interface facility 104 may determine not to fetch another block of graphical assets. If the new position is outside of the block that has already been fetched, user interface facility 104 may determine to fetch another block of graphical assets that corresponds to the new position.

As another example of user interface operations, user interface facility 104 may provide one or more scrolling features such that a user may provide input to scroll a user-scrollable view across one or more of the paginated columns. The scrolling features may include vertical smooth scrolling capabilities and/or horizontal paginated scrolling capabilities.

To illustrate an example of a vertical smooth scaling user interface operation, with a user-scrollable view positioned as represented by dashed-line box 610 in FIG. 7, user interface facility 104 may display the section of paginated column 612-1 included within dashed-line box 610 in an interactive media program guide GUI view. While this section is displayed, a user of device 200 may provide input configured to initiate vertical scrolling across the paginated column 612-1 on which the user-scrollable view is positioned. For instance, the user may provide a "downward swipe" touch gesture on a touch screen display. User interface facility 104 may detect the input and respond by scrolling the user-scrollable view downward across the paginated column 612-1, as illustrated by arrow 802 and the new position of the user-scrollable view indicated by dashed-line box 610 in FIG. 8. This vertical scrolling may comprise smooth scrolling operations and/or visual effects and may allow the user to position the user-scrollable view at any vertical position relative to the paginated column 612-1.

User interface facility 104 may selectively initiate fetching of one or more blocks of graphical assets based on such vertical scrolling, such as described herein.

Based on one or more attributes of the vertical scrolling, user interface facility 104 may render graphical assets included within the user-scrollable view to display the section of the paginated column 612-1 defined by the position of the user-scrollable view. In certain examples, user interface facility 104 may be configured to start rendering graphical assets based on a scrolling speed deceleration threshold. To illustrate, a user may provide scrolling input by flicking his or her finger downward on a touch screen display when a section of paginated column 612-1 is displayed in the user-scrollable view. In response, user interface facility 104 may calculate a scroll speed based on the flick input and scroll the user-scrollable view downward along the paginated column 612-1 at the scroll speed. If no additional scroll input is provided, the user interface facility 104 may decelerate the scroll speed in accordance with a predefined scrolling deceleration heuristic. When the scroll speed decelerates to a speed that satisfies a predefined deceleration threshold (e.g., ten percent of the initial scroll speed), user interface facility 104 may start rendering graphical assets of a section of the paginated column 612-1 that is within the user-scrollable view.

Figure 8:
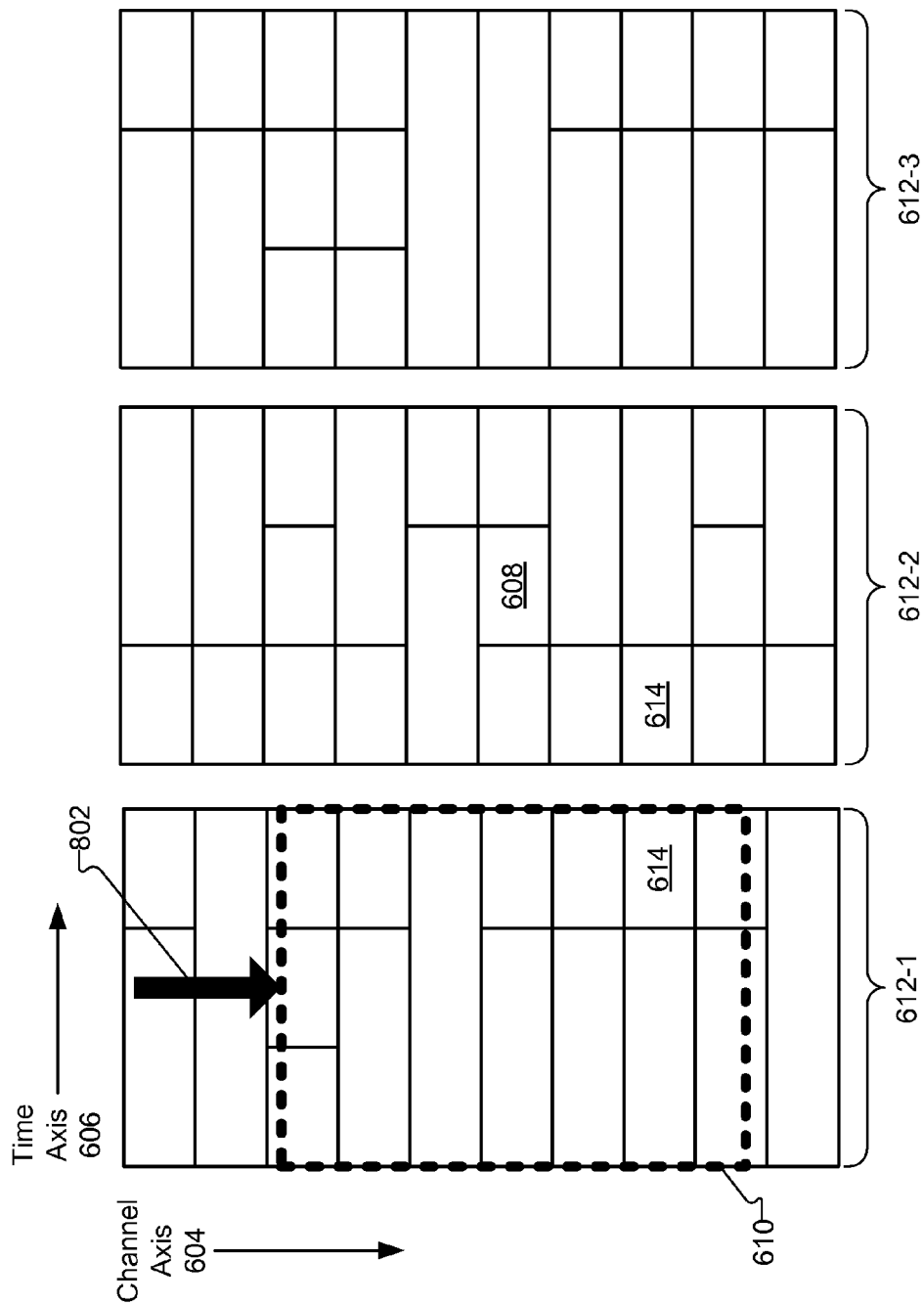
FIG. 8 illustrates an example of smooth vertical scrolling of a user-scrollable view across a paginated column of an interactive media program guide according to principles described herein.

To illustrate an example of horizontal paginated scaling user interface operations, with the user-scrollable view positioned as represented by dashed-line box 610 in FIG. 8, user interface facility 104 may display the section of paginated column 612-1 included within dashed-line box 610 in an interactive media program guide GUI view. While this section is displayed, a user of device 200 may provide input configured to initiate horizontal scrolling from the paginated column 612-1 on which the user-scrollable view is positioned to another paginated column (e.g., paginated column 612-2). For instance, the user may provide a "horizontal left-to-right swipe" touch gesture on a touch screen display. User interface facility 104 may detect the input and respond by scrolling the user-scrollable view horizontally from paginated column 612-1 to paginated column 612-1, as illustrated by arrow 902 and the new position of the user-scrollable view indicated by dashed-line box 610 in FIG. 9. This horizontal scrolling may comprise paginated scrolling operations and/or visual effects and may allow the user to position the user-scrollable view on any of the paginated columns 612. The horizontal scrolling may include visually snapping the user-scrollable view onto a paginated column 612 such that the side edges of the user-scrollable view align with the side edges of the paginated column 612.

A paginated scrolling from one paginated column to another paginated column (e.g., from paginated column 612-1 to paginated column 612-2) may be represented on a display screen to create a visual effect (e.g., a visual page turning effect) of the user-scrollable view moving horizontally from one paginated column to another paginated column. In certain implementations, this paginated scrolling may be accomplished by repopulating a table provided by a table view control (e.g., an operating system table view control) and representing a paginated column. For example, before the paginated horizontal scrolling, the table represent paginated column 612-1. The paginated horizontal scrolling may include user interface facility 104 repopulating the table with information and/or graphical assets associated with the destination paginated column 612-2. In some examples, a visual transition may be provided by taking a screenshot of the user-scrollable view when the scroll input is detected (a user-scrollable view of a section of the table when the table represents paginated column 612-1) and setting the screenshot as a background image that is displayed in the background as the table displayed in the foreground repopulates to represent the destination paginated column 612-2.

Thus, in any of the ways described above or a similar manner, a user of device 200 may provide input and direct user interface facility 104 to scroll the user-scrollable view horizontally in a paginated manner from one paginated column to another paginated column (e.g., like the user is turning column pages) and/or vertically in a continuous manner within a paginated column.

As another example of user interface operations, user interface facility 104 may be configured expand any selected cell in-place within a paginated column 612 of the matrix grid 602 of cells. The expansion may allow display content associated with a media program represented by the cell (e.g., additional media program listing information associated with the cell) to be presented within the expanded cell and within the structural context of the matrix grid 602 of cells, which may promote a quality user experience with an interactive media program guide user interface.

User interface facility 104 may be configured to expand the cell in any way that is suitable to place an expanded version of the cell in-place with the matrix grid 602 of cells. For example, graphical assets representing the unexpanded cell may be expanded to form the expanded cell and to make space within the expanded cell for display content such as additional media program listing information. Alternatively, new graphical assets representing the expanded cell may be fetched and inserted within the matrix grid 602 of cells.

In certain examples, "in-place" cell expansion may mean that the expanded cell is located contextually within the same position as the unexpanded cell in the matrix grid 602 of cells. For example, the expanded cell may be within the same channel row and/or time slot. Additionally or alternatively, "in-place" may mean "in-line" within a channel lineup represented along the channel axis 604 of the matrix grid 602 of cells. For example, the expanded cell may be within the same channel row as the unexpanded cell and may not obstruct any other channel rows (e.g., channel rows adjacent to the channel row) from view.

The expansion of the cell in-place may include expanding the paginated column 612 that includes the cell to make space for the expanded cell. The expansion of the paginated column 612 may include moving all channel rows located below the channel row that contains the expanded cell downward away from the channel row that contains the expanded cell to part the paginated column 612 and make space for the expanded cell. User interface facility 104 may then place graphical assets representing the expanded cell within the space and without obstructing any of the other channel rows (e.g., channel rows adjacent to the channel row that includes the selected cell) included in the user-scrollable view of the paginated column 612.

User interface facility 104 may populate the expanded cell with display content associated with a media program represented by the media program listing associated with the cell. The display content may include, without limitation, additional media program listing information not included in the cell prior to the expanding of the cell (e.g., a media program synopsis, description, rating, identification information such as series and/or episode information, etc.), a presentation of the media program (e.g., a live video playback of the media program), a user selectable option to add the media program to a favorites list, a user selectable option to record a scheduled transmission of the media program, a user selectable option to present the media program on a display screen of the user device, and a user selectable option to direct a media content processing device communicatively coupled to the user device to present the media program. Examples of such display content presented within an expanded cell are illustrated herein.

Figure 9:
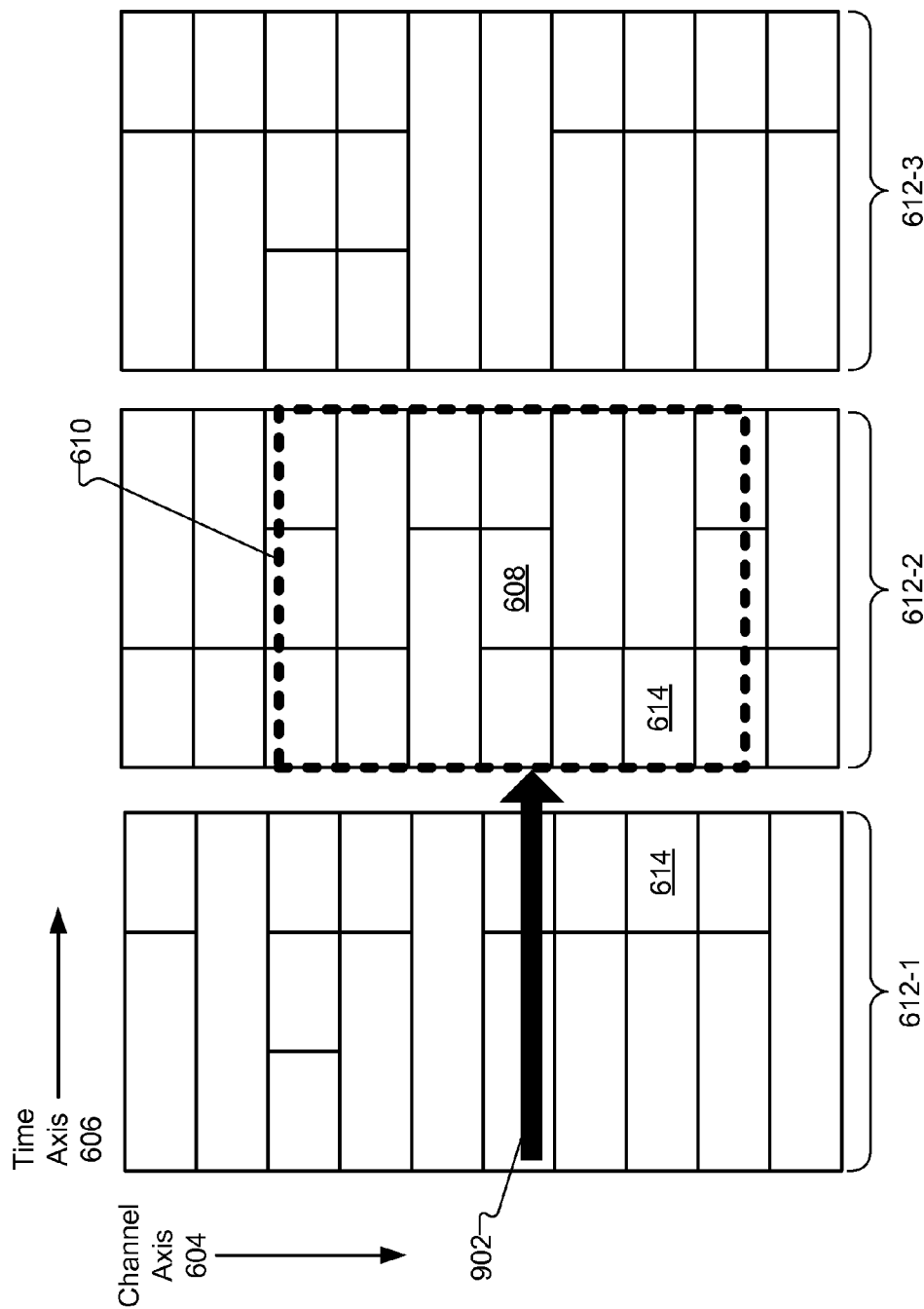
FIG. 9 illustrates an example of paginated horizontal scrolling of a user-scrollable view from one paginated column to another paginated column of an interactive media program guide according to principles described herein.

To illustrate an example of in-place cell expansion, with the user-scrollable view positioned as represented by dashed-line box 610 in FIG. 9, a user of device 200 may provide input configured to indicate a user selection of a particular cell displayed in the user-scrollable view. For example, the user may provide touch input to select cell 608. User interface facility 104 may detect the user selection of cell 608 and respond by expanding the cell 608 in-place within the paginated column 612-2, which may include repositioning one or more other channel rows and/or cells included in the paginated column 612-2 to make space for the expanded cell and placing the expanded cell in the space.

Figure 10:
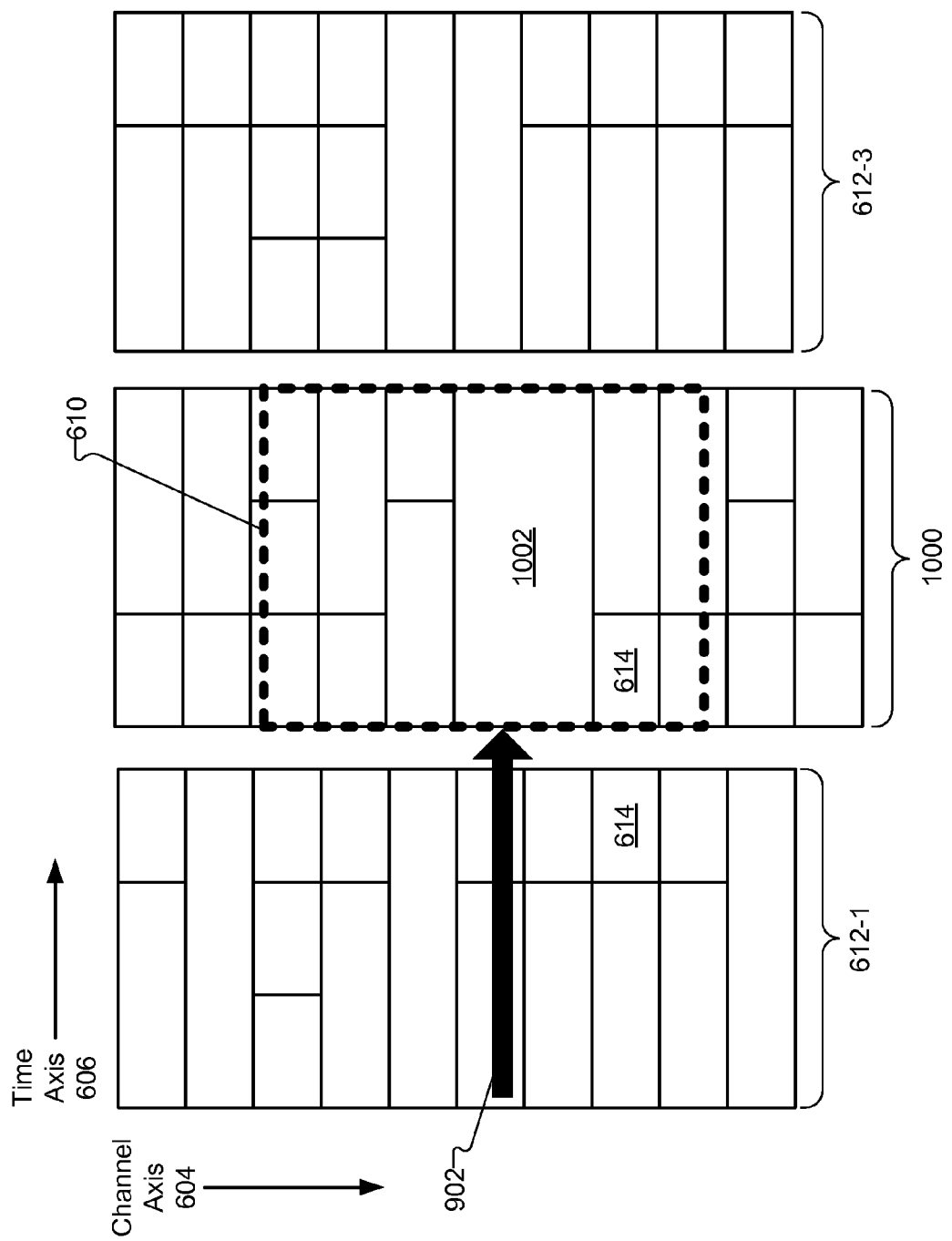
FIG. 10 illustrates an example of in-place cell expansion within a paginated column of an interactive media program guide according to principles described herein.

FIG. 10 illustrates an expanded version of paginated column 612-2 that has been modified by user interface facility 104 for in-place cell expansion. As shown, an expanded paginated column 1000 includes an expanded cell 1002, which is an expanded version of cell 608 and represents the same media program listing represented by cell 608. As further shown, the four channel rows below the channel row that includes the selected cell 608 have been moved downward to make space for the expanded cell 1002 in-place within the matrix grid of cells included in expanded paginated column 1000. The shifting downward of the four channel rows expands the size (e.g., the vertical length) of paginated column 612-2 to form expanded paginated column 1000. User interface facility 104 may apply this expansion of cell 608 and paginated column 612-2 without expanding the other paginated columns 612-1 and 612-3. As shown in FIG. 10, paginated column 612-2 has been expanded to form expanded paginated column 1000 that includes expanded cell 1002 in-place, and paginated columns 612-1 and 612-3 remain unchanged.

The use of paginated columns 612 to represent series of time segments of the interactive media program guide 600 allows user interface facility 104 to expand cell 608 in-place within paginated column 612-2 with reduced resource costs compared to conventional interactive media program guide user interface techniques. One reason for this is user interface facility 104 expanding only paginated column 612-2 to make space for expanded cell 1002 instead of having to expand the matrix grid 602 of cells across all of the interactive media program guide 600 to make space for the expanded cell 1002.

As shown in FIG. 10, the expanded cell 1002 may be positioned in-line within the line-up of channel rows in the paginated column 1000 and without obstructing any of the adjacent channel rows from view. This may help a user of device 200 to avoid confusion that may otherwise be caused by having a channel row obstructed by the expanded cell 1002.

As further shown in FIG. 10, the expanded cell 1002 may be positioned across the entire width of expanded paginated column 1000, which may help maximize the amount of display content that may be presented within the expanded cell 1002. The expanded cell 1002 may be overlaid on other cells included in the same channel row in the user-scrollable view. For example, FIG. 9 shows cells on either side of cell 608. These cells may be obstructed from view by the expanded cell 1002 as shown in FIG. 10.

In certain implementations, user interface facility 104 may be configured to use a table view control, such as a table view control that is native to an operating system running on device 200 (e.g., a table view control in an operating system known as "iOS") to expand a cell within a paginated column. For example, the table view control may provide functionality for expanding the size of a channel row within a table that is used to represent the paginated column. The expansion may include moving channel rows positioned below the expanded channel row downward to make space for the expanded channel row.

User interface facility 104 may be configured to populate the expanded channel row with display content associated with the media program represented by a select cell included in the channel row. Thus, when a user selects cell 608, user interface facility 104 may use the table view control to expand the channel row that includes cell 608 to form expanded cell 1002. User interface facility 608 may determine that cell 608 was selected and populate the expanded channel row (i.e., expanded cell 1002) with display content associated with the media program represented by cell 608.

User interface facility 104 may be configured to remove expanded cell 1002 from the user-scrollable view in response to certain user input, such as scroll input. For example, while the expanded cell 1002 is displayed in the user-scrollable view, a user may provide input to vertically or horizontally scroll the user-scrollable view. In response, user interface facility 104 may remove the expanded cell 1002 from the user-scrollable view. In certain examples, the removal may include reversing the expanding of cell 608 to form expanded cell 1002, thereby reverting the expanded cell back to the unexpanded cell. This may include reversing the expansion of the paginated column 612-2, thereby reverting expanded paginated column 1000 back to paginated column 612-2. Additionally or alternatively, the scrolling may move the user-scrollable view off of the expanded cell 1002 or unexpanded cell 608, thereby removing the expanded cell 1002 or unexpanded cell 608 from the user-scrollable view.

Figure 11:
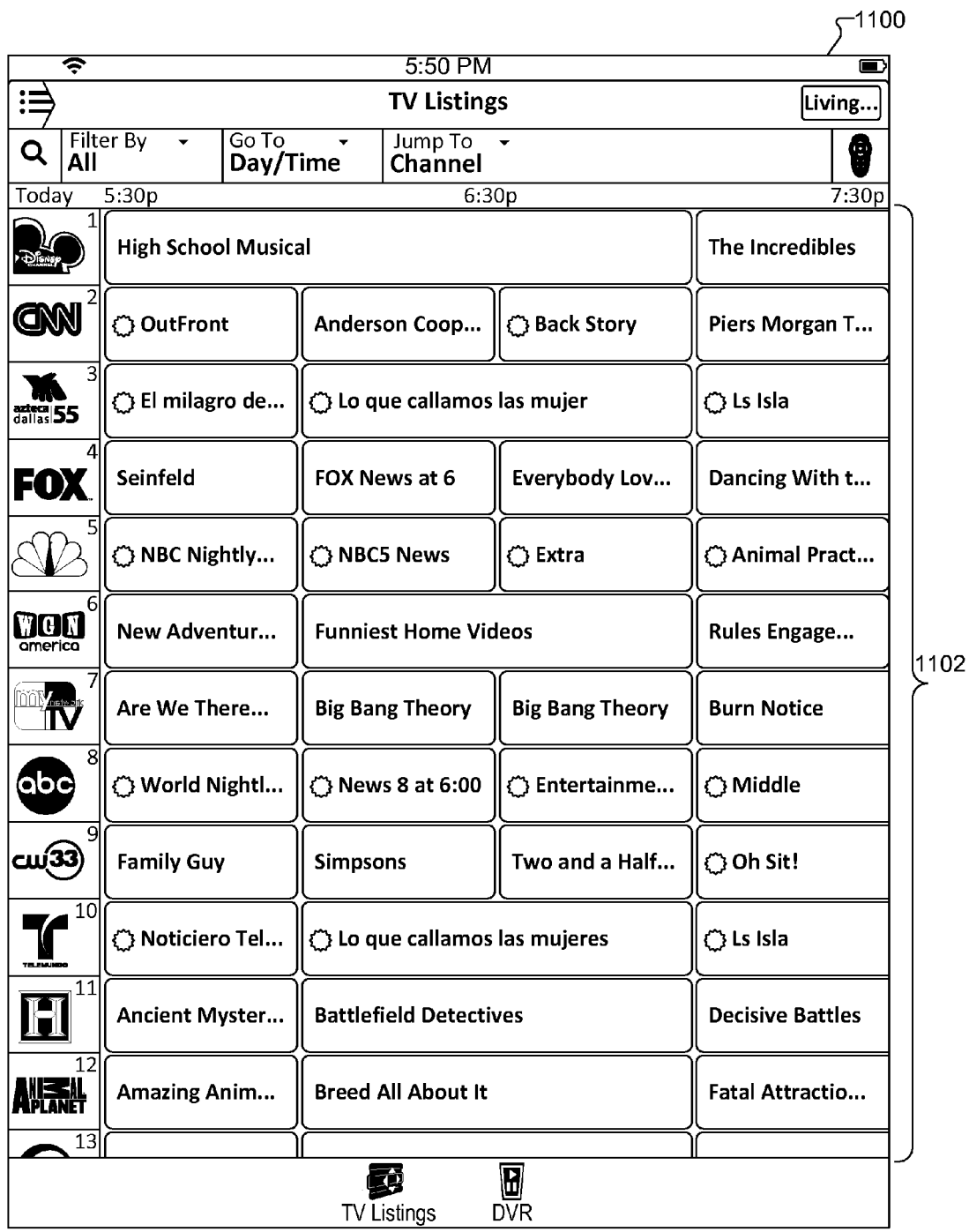
FIGS. 11-13 illustrate exemplary graphical user interface views that may be displayed on a display screen according to principles described herein.

FIG. 11 illustrates a GUI 1100 that includes an exemplary user-scrollable view 1102 of a section of an interactive media program guide such as interactive media program guide 600. As shown, the user scrollable view 1102 may display a matrix of cells that represent media program listings and that are arranged along a channel axis having a channel lineup and along a segment of a time axis. In FIG. 11, the segment along the time axis has a length of two hours (e.g., 5:30 PM-7:30 PM).

While user-scrollable view 1100 is displayed, a user may provide input to select a cell representing a media program listing for a television program titled "FOX 4 News at 6." User interface facility 104 may detect the user selection of the cell and respond by displaying an expanded version of the cell in-line within the context of the matrix grid of cells (e.g., in line with the channel lineup along the channel axis).

Figure 12:
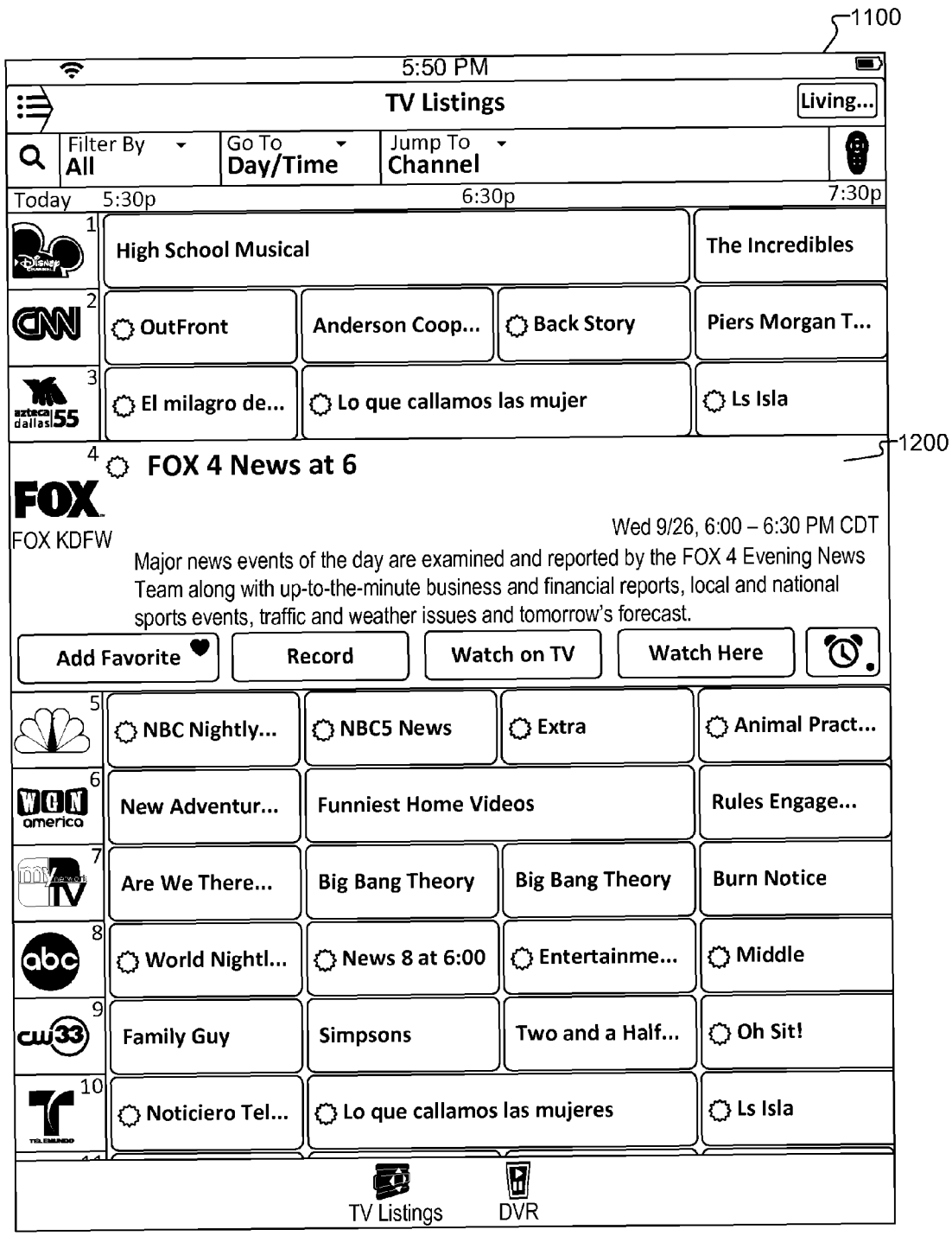

FIG. 12 illustrates user-scrollable view 1102 in GUI 1100 to include an expanded cell 1200, which is an expanded version of the selected cell for the "FOX 4 News at 6" television program that may be displayed in response to the user selection of the cell. As shown, the channel row of the expanded cell 1200 may be positioned in-line along the channel axis such that no other channel rows are obstructed from view by the expanded cell 1200.

The expanded cell 1200 may be populated with and present display content. For example, FIG. 12 shows the expanded cell 1200 to include detailed media program listing information for the "FOX 4 News at 6" television program (which may include additional media program listing information not displayed in the unexpanded cell). For example, the expanded cell may include data representing the channel number for the television channel on which the television program is scheduled for transmission, a logo and/or other information for the television channel, the title of the television program, a rating for the television program, transmission date and time information for the television program, and a description of the television program. The media program listing information shown in FIG. 12 is illustrative only. Additional or alternative media program listing information may be presented within the expanded cell 1200 in other examples.

In addition, FIG. 12 shows the expanded cell 1200 to include user selectable options such as an "add favorite" options that may be selected by a user to add the media program to a favorites list, a "record" option that may be selected by a user to record the scheduled transmission of the media program represented by the expanded cell 1200, a "watch on TV" option that may be selected by a user to cause the media program to be played back by media content processing device (e.g., a set-top box) on a television device, and a "watch here" option that may be selected by a user to cause the media program to be played back on the display screen of the same user device that displays GUI 1100.

In response to a user selection of the "watch here" option, user device 200 displaying GUI 1100 may communicate with media content provider subsystem 410 to request and receive a stream carrying the television program. The device 200 may then use the stream to play back the television program.

In response to a user selection of the "watch on TV" option, user device 200 displaying GUI 1100 may communicate with the media content processing device 406 (e.g., by way of local area network 408) and direct the media content processing device 406 to access (e.g., tune to) the television program from provider subsystem 410 and present the program (e.g., on a television device connected to the media content processing device 406).

Figure 13:
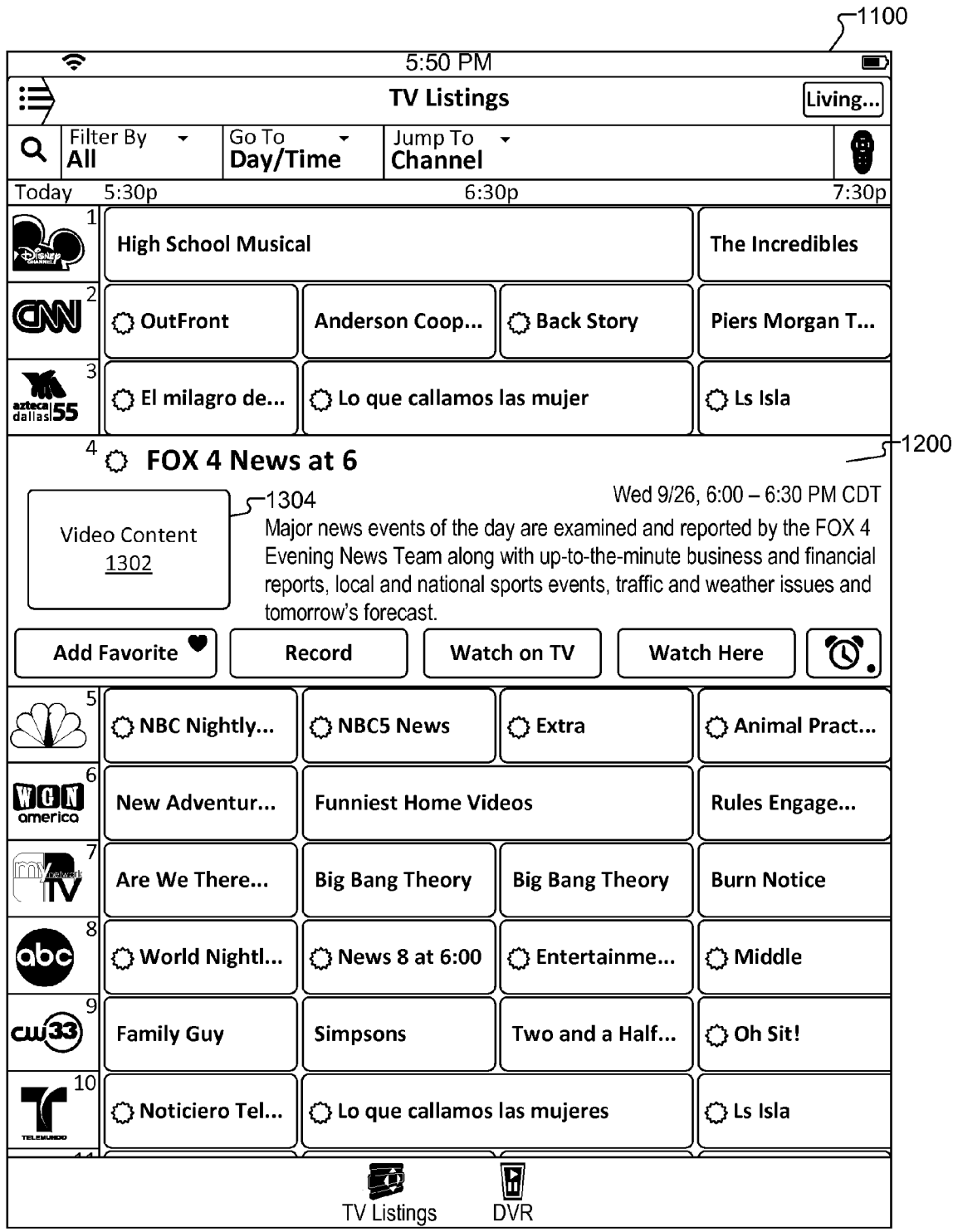

In certain examples, the expanded cell 1200 may be populated with a presentation of the television program (e.g., a live video playback of the "FOX 4 News at 6" television program). For example, after the expanded cell 1200 has been displayed for a predefined threshold length of time (e.g., a few seconds), user interface facility 104 may begin playing back a live video feed of the television program within the expanded cell 1200 (e.g., within a thumbnail window in the expanded cell 1200). FIG. 13 illustrates an example of video content 1302 (e.g., live video of the "FOX 4 News at 6" television program) being played back in a video window 1304 within the expanded cell 1200.

Figure 14:
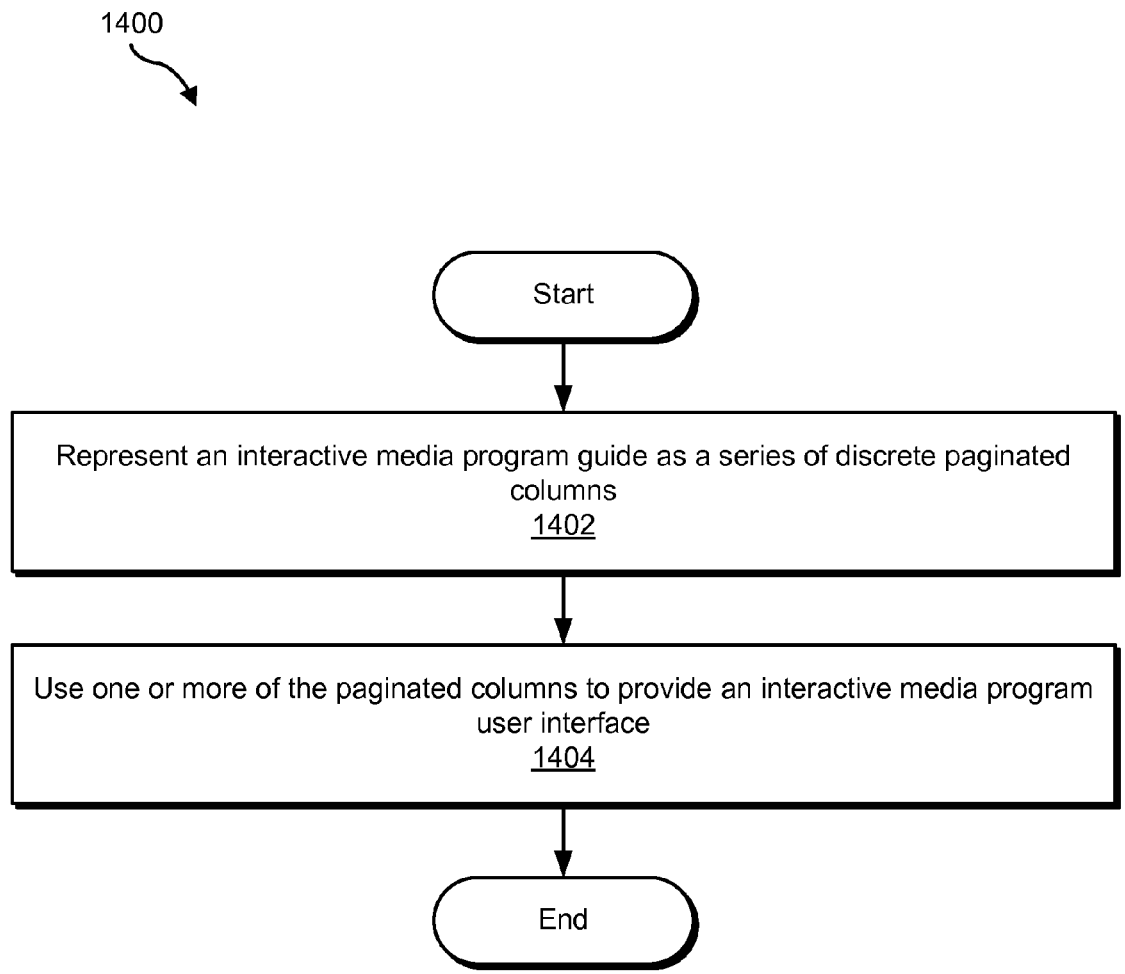
FIG. 14-15 illustrate exemplary interactive media program guide methods according to principles described herein.

FIG. 14 illustrates an exemplary interactive media program guide method 1400. While FIG. 14 illustrates exemplary steps according to one embodiment, other embodiments may omit, add to, reorder, combine, repeat, and/or modify any of the steps shown in FIG. 14. The steps shown in FIG. 14 may be performed by any component or combination of components of an interactive media program guide system (e.g., system 100) and/or one or more devices implementing the system.

In step 1402, an interactive media program guide system represents an interactive media program guide as a series of discrete paginated columns. Step 1402 may be performed in any of the ways described herein.

In step 1404, the system uses one or more of the paginated columns to provide an interactive media program user interface. Step 1404 may be performed in any of the ways described herein. For example, the system may use one or more of the paginated columns in one or more of the exemplary user interface operations described herein.

Figure 15:
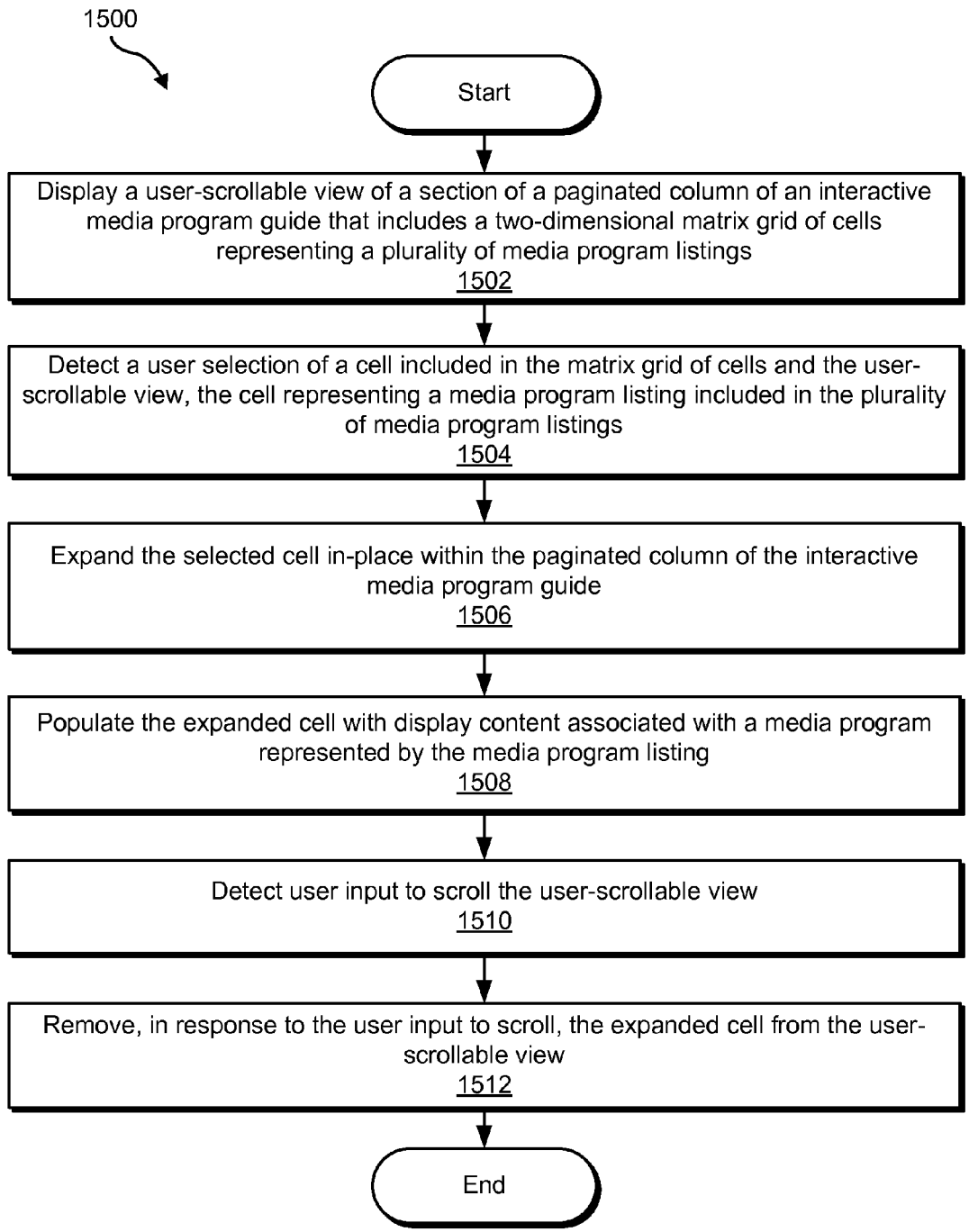

FIG. 15 illustrates another exemplary interactive media program guide method 1500. While FIG. 15 illustrates exemplary steps according to one embodiment, other embodiments may omit, add to, reorder, combine, repeat, and/or modify any of the steps shown in FIG. 15. The steps shown in FIG. 15 may be performed by any component or combination of components of an interactive media program guide system (e.g., system 100) and/or one or more devices implementing the system.

In step 1502, an interactive media program guide system displays a user-scrollable view of a section of a paginated column of an interactive media program guide that includes a two-dimensional matrix grid of cells representing a plurality of media program listings, such as described herein.

In step 1504, the system detects a user selection of a cell included in the matrix grid of cells and the user-scrollable view, such as described herein. The cell represents a media program listing included in the plurality of media program listings.

In step 1506, the system expands the selected cell in-place within the paginated column of the interactive media program guide. Step 1506 may be performed in any of the ways described herein.

In step 1508, the system populates the expanded cell with display content associated with a media program represented by the media program listing. Step 1508 may be performed in any of the ways described herein.

In step 1510, the system detects user input to scroll the user-scrollable view, such as described herein.

In step 1512, the system removes the expanded cell from the user-scrollable view in response to the user input to scroll. Step 1512 may be performed in any of the ways described herein.

In certain embodiments, one or more of the components and/or processes described herein may be implemented and/or performed by one or more appropriately configured computing devices (e.g., one or more communication devices). To this end, one or more of the systems and/or components described above may include or be implemented by any computer hardware and/or computer-implemented instructions (e.g., software) embodied on a non-transitory computer-readable medium and configured to direct one or more computing devices to perform one or more of the processes described herein. In particular, system components may be implemented on one physical computing device or may be implemented on more than one physical computing device. Accordingly, system components may include any number of computing devices, and may employ and/or interface with any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 16:
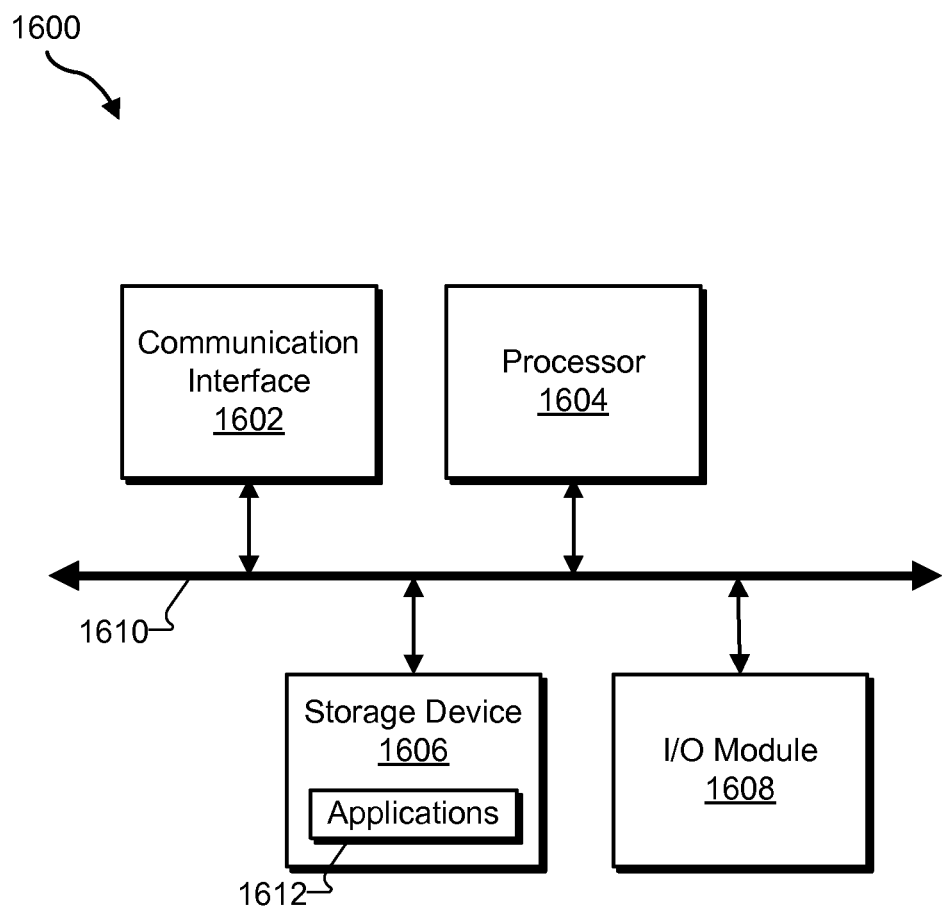
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a communications medium interface, a modem, and any other suitable interface. Communication interface 1602 may be configured to interface with any suitable communication media, protocols, and formats, including any of those mentioned above.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 (which may include, but are not limited to, one or more of the software applications described herein) configured to direct processor 1604 to perform any of the operations described herein may be stored within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more processes or functions associated with access facility 102 and/or user interface facility 104. Likewise, storage facility 106 may be implemented by or within storage device 1606.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    displaying, by an interactive media program guide system on a display screen of a mobile user device, a user-scrollable view of a section of a paginated column of an interactive media program guide that includes a two-dimensional matrix grid of cells representing a plurality of media program listings, the paginated column of the interactive media program guide being divided and structurally separate from other discrete paginated columns of the interactive media program guide;
    detecting, by the interactive media program guide system, a user selection of a cell included in the matrix grid of cells and the user-scrollable view, the cell representing a media program listing included in the plurality of media program listings; and
    in response to the user selection of the cell
        expanding, by the interactive media program guide system, the cell in-place within the paginated column of the interactive media program guide, and
        populating, by the interactive media program guide system, the expanded cell with display content associated with a media program represented by the media program listing.

2. The method of claim 1, wherein the expanding of the cell in-place within the paginated column comprises:
    expanding the paginated column to make a space for the expanded cell in-place; and
    positioning the expanded cell in the space.

3. The method of claim 2, wherein:
    the selected cell is included in a channel row in the paginated column;
    the paginated column includes one or more channels rows positioned below the channel row that includes the selected cell; and
    the expanding of the paginated column comprises shifting the one or more channel rows positioned below the channel row that includes the selected cell downward away from the channel row that includes the selected cell.

4. The method of claim 2, wherein:
    the selected cell is included in a channel row in the paginated column; and
    the expanded cell does not obstruct any other channel row in the paginated column.

5. The method of claim 1, wherein the display content comprises additional media content listing information not included in the cell prior to the expanding of the cell.

6. The method of claim 1, wherein the display content comprises a live video playback of the media program.

7. The method of claim 1, wherein the display content comprises at least one of:
    a user selectable option to add the media program to a favorites list;
    a user selectable option to record a scheduled transmission of the media program;
    a user selectable option to present the media program on the display screen of the mobile user device; and
    a user selectable option to direct a media content processing device communicatively coupled to the mobile user device to present the media program.

8. The method of claim 1, further comprising:
    detecting, by the interactive media program guide system, user input to scroll the user-scrollable view; and
    removing, by the interactive media program guide system in response to the user input to scroll, the expanded cell from the user-scrollable view.

9. The method of claim 1, embodied as computer-executable instructions on at least one non-transitory computer-readable medium.

10. A method comprising:
    representing, by an interactive media program guide system implemented by a mobile device, an interactive media program guide that includes a two-dimensional matrix grid of cells as a series of discrete paginated columns that represent a series of segments of time along a time dimension of the two-dimensional matrix grid of cells, each paginated column included in the series of discrete paginated columns being divided and structurally separate from other paginated columns included in the series of discrete paginated columns; and
    using, by the interactive media program guide system, a paginated column included in the series of paginated columns to provide an interactive media program guide user interface for display on a display screen of the mobile device.

11. The method of claim 10, wherein the representing comprises:
    determining a paginated column width based at least in part on an attribute of the display screen of the mobile device; and
    defining the series of paginated columns based on the paginated column width.

12. The method of claim 11, wherein the paginated column width defines a length of time spanned by each of the segments of time represented by each of the paginated columns.

13. The method of claim 11, wherein the attribute of the display screen comprises a pixel width of the display screen.

14. The method of claim 13, wherein the paginated column width equals the pixel width of the display screen.

15. The method of claim 10, wherein the using of the paginated column to provide the interactive media program guide user interface comprises displaying, on the display screen of the mobile device, a user-scrollable view of a section of the paginated column.

16. The method of claim 15, wherein the displaying of the user-scrollable view of the section of the paginated column comprises:
fetching media content listing data for a block of cells included in the paginated column, the block of cells having a width equal to a paginated column width of the paginated column and a height equal to a predefined number of channel rows; and
using the fetched media content listing data to populate the user-scrollable view of the section of the paginated column.

17. The method of claim 15, wherein the using of the paginated column to provide the interactive media program guide user interface further comprises:
detecting user input to scroll vertically; and
smooth scrolling the user-scrollable view vertically across the paginated column in response to the user input.

18. The method of claim 15, wherein the using of the paginated column to provide the interactive media program guide user interface further comprises:
detecting user input to scroll horizontally; and
paginated scrolling the user-scrollable view horizontally from the paginated column to another paginated column included in the series of paginated columns.

19. The method of claim 15, wherein the using of the paginated column to provide the interactive media program guide user interface further comprises:
detecting user input to select a cell included in the matrix grid of cells and displayed in the user-scrollable view of the section of the paginated column; and
expanding the selected cell in-place within the paginated column.

20. The method of claim 19, wherein the expanding of the selected cell in-place comprises:
expanding the paginated column to make space for the expanded cell in-place; and
positioning the expanded cell in the space.

21. The method of claim 19, wherein:
the selected cell is included in a channel row in the paginated column;
the paginated column includes one or more channels rows positioned below the channel row that includes the selected cell; and
the expanding of the paginated column comprises shifting the one or more channel rows positioned below the channel row that includes the selected cell downward away from the channel row that includes the selected cell.

22. The method of claim 19, wherein:
the selected cell is included in a channel row in the paginated column; and
the expanded cell does not obstruct any other channel row in the paginated column.

23. The method of claim 10, embodied as computer-executable instructions on at least one non-transitory computer-readable medium.

24. A system comprising:
a processor; and
a user interface facility configured to direct the processor to
display, on a touch screen display of a mobile device, a user-scrollable view of a section of a paginated column of an interactive media program guide that includes a two-dimensional matrix grid of cells representing a plurality of media program listings, the paginated column of the interactive media program guide being divided and structurally separate from other discrete paginated columns of the interactive media program guide,
detect a user selection of a cell included in the matrix grid of cells and the user-scrollable view, the cell representing a media program listing included in the plurality of media program listings, and
in response to the user selection of the cell
expand the cell in-place within the paginated column of the interactive media program guide, and
populate the expanded cell with display content associated with a media program represented by the media program listing.

25. The method of claim 1, wherein the paginated column of the interactive media program guide extends vertically beyond the section of the paginated column of the interactive media program guide currently displayed on the display screen of the mobile user device to facilitate vertical scrolling of the paginated column.

26. The method of claim 1, wherein the expanding of the cell in-place within the paginated column of the interactive media program guide comprises expanding only the cell selected by the user.

* * * * *